United States Patent
Coradi et al.

(10) Patent No.: US 10,186,031 B2
(45) Date of Patent: *Jan. 22, 2019

(54) SHAPE SIMILARITY MEASURE FOR BODY TISSUE

(71) Applicant: Varian Medical Systems International AG, Cham (CH)

(72) Inventors: Thomas Coradi, Lenzburg (CH); Benjamin Haas, Wabern (CH)

(73) Assignee: Varian Medical Systems International AG, Cham (CH)

(*) Notice: Subject to any disclaimer, the term of this patent is extended or adjusted under 35 U.S.C. 154(b) by 18 days.

This patent is subject to a terminal disclaimer.

(21) Appl. No.: 15/365,537

(22) Filed: Nov. 30, 2016

(65) Prior Publication Data

US 2017/0084030 A1    Mar. 23, 2017

Related U.S. Application Data

(63) Continuation of application No. 14/746,504, filed on Jun. 22, 2015, now Pat. No. 9,558,427.

(Continued)

(51) Int. Cl.
| | |
|---|---|
| *G06K 9/00* | (2006.01) |
| *G06T 7/00* | (2017.01) |
| *G06K 9/62* | (2006.01) |
| *G06T 7/12* | (2017.01) |
| *G06T 7/149* | (2017.01) |

(52) U.S. Cl.
CPC .......... *G06T 7/0012* (2013.01); *G06K 9/6204* (2013.01); *G06K 9/6215* (2013.01); *G06T 7/0089* (2013.01); *G06T 7/12* (2017.01); *G06T 7/149* (2017.01); *G06T 2207/10081* (2013.01);
(Continued)

(58) Field of Classification Search
None
See application file for complete search history.

(56) References Cited

U.S. PATENT DOCUMENTS 6,249,594 B1 * 6/2001 Hibbard ............... G06T 7/0012
382/128
6,664,980 B2 * 12/2003 Bryan ............... G06F 17/30994
707/E17.142

(Continued)

OTHER PUBLICATIONS

U.S. Appl. No. 14/746,504, "Non-Final Office Action", dated Jul. 1, 2016, 5 pages.

(Continued)

*Primary Examiner* — Avinash Yentrapati
(74) *Attorney, Agent, or Firm* — Kilpatrick Townsend & Stockton LLP

(57) ABSTRACT

A shape similarity metric can be provided that indicates how similar two or more shapes are. A difference between a union of the shapes and an intersection of the shapes can be used to determine the similarity metric. The shape similarity metric can provide an average distance between the shapes. Different processes for determining shapes can be evaluated for accuracy based on the shape similarity metric. New or alternative shape-determining processes can be compared for accuracy against other shape-determining processes including reference shape-determining processes. Shape similarity metrics can be determined for two-dimensional shapes and three-dimensional shapes.

25 Claims, 9 Drawing Sheets

Related U.S. Application Data

(60) Provisional application No. 62/015,325, filed on Jun. 20, 2014.

(52) U.S. Cl.
CPC ............... *G06T 2207/10088* (2013.01); *G06T 2207/20124* (2013.01); *G06T 2207/30004* (2013.01)

(56) References Cited

U.S. PATENT DOCUMENTS

| | | | | |
|---|---|---|---|---|
| 7,705,854 B2* | 4/2010 | Abshear | ................ | G06F 19/26 345/440 |
| 9,558,427 B2 | 1/2017 | Coradi et al. | | |
| 2007/0031003 A1* | 2/2007 | Cremers | .............. | G06K 9/6207 382/103 |
| 2010/0246956 A1* | 9/2010 | Porikli | ..................... | G06T 7/11 382/173 |
| 2010/0278425 A1* | 11/2010 | Takemoto | ................. | G06T 7/10 382/173 |
| 2011/0026781 A1* | 2/2011 | Osadchy | ................. | H04L 9/008 382/118 |
| 2011/0238408 A1* | 9/2011 | Larcheveque | ...... | G06F 17/2785 704/9 |
| 2012/0230586 A1* | 9/2012 | Blennerhassett | ......... | G06T 9/20 382/173 |
| 2014/0125666 A1* | 5/2014 | Noh | ..................... | H04N 13/128 345/421 |
| 2014/0201126 A1* | 7/2014 | Zadeh | .................... | G06K 9/627 706/52 |
| 2015/0324091 A1* | 11/2015 | Jiao | .................. | G06F 17/30899 715/765 |
| 2015/0371392 A1 | 12/2015 | Coradi et al. | | |

OTHER PUBLICATIONS

U.S. Appl. No. 14/746,504, "Notice of Allowance", dated Oct. 6, 2016, 8 pages.

* cited by examiner

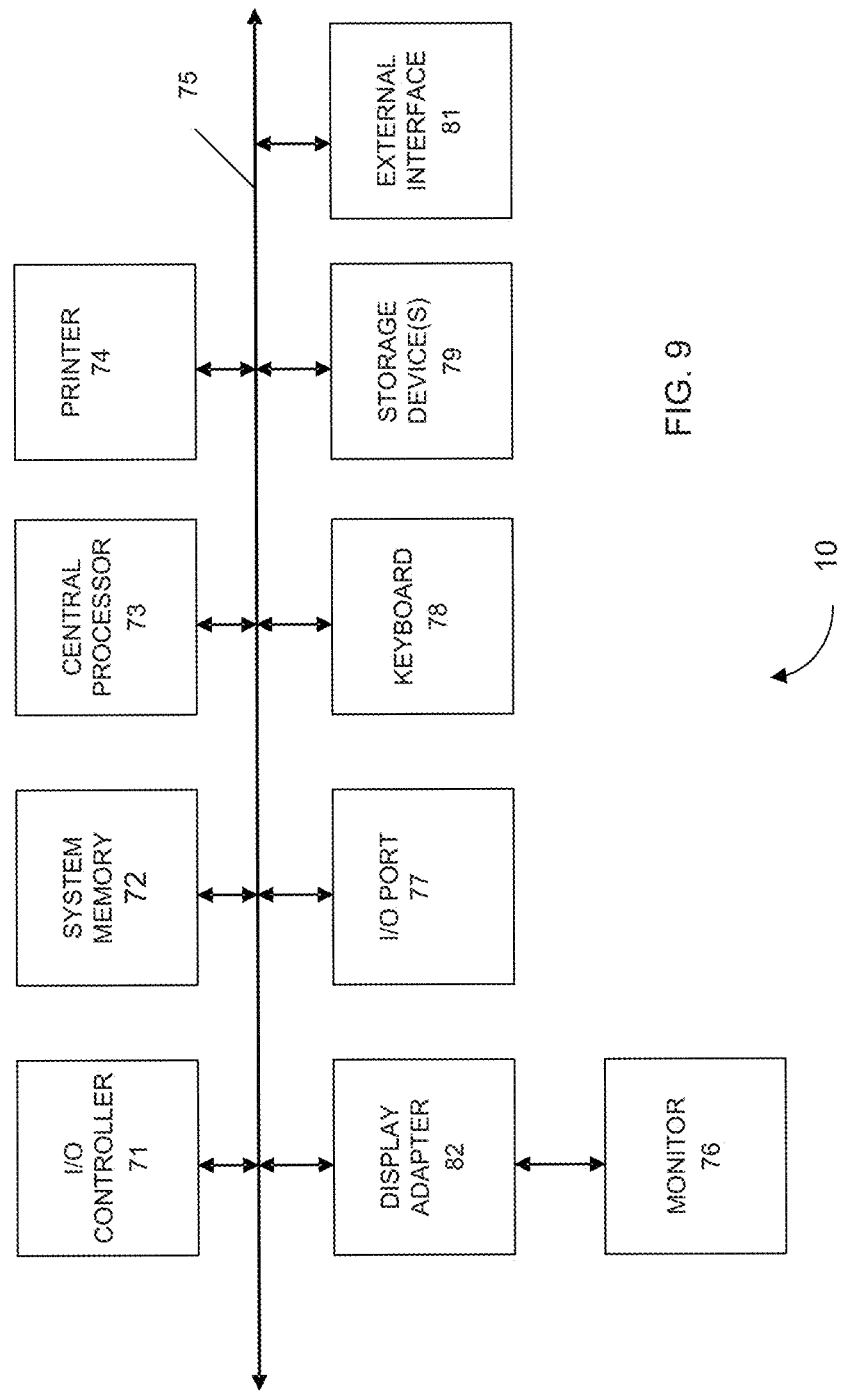

SHAPE SIMILARITY MEASURE FOR BODY TISSUE

CROSS-REFERENCE TO RELATED APPLICATIONS

This application is a continuation of U.S. patent application Ser. No. 14/746,504 filed on Jun. 22, 2015 which claims priority and benefit from U.S. Provisional Application No. 62/015,325, filed Jun. 20, 2014, entitled "A NEW SHAPE SIMILARITY MEASURE," the entire contents of which are incorporated herein by reference for all purposes.

TECHNICAL FIELD

The present disclosure generally relates to image processing, and more particularly to comparing shapes determined for body tissues in images of one or more patients, e.g., to improve shape-determining processes and to determine suitable treatment plans.

BACKGROUND

In image processing, there is a need for tools for an automated quality assessment of different algorithms. Typically, there is interest in a comparison against a gold standard or against a previous version of an algorithm.

In the area of automated organ outlining on medical images like CT or MRI, there is the need for an efficient, robust and comprehensible method of comparing different shapes. For example, algorithms can be used for determining a shape of an organ (e.g., kidney, liver, etc.). It is desirable to assess a quality of the determined shape.

Existing methods for comparing shapes include the Dice similarity measurement and the Hausdorff distance measurement, but they can be inaccurate or at least provide undesirable results. For example, the Dice similarity measurement is affected by the scale of the shapes with a fixed offset, indicating a better match as the shapes increase in size. Also, the metric produced by the Dice similarity measurement is a unitless ratio of similarity, which may be unhelpful for certain types of comparisons. The Hausdorff distance measurement produces a metric with distance units, but the Hausdorff distance measurement can provide misleading results because the process can be dramatically affected by outlying points. Also, the measurement can be difficult to execute properly.

Therefore, it is desirable to provide techniques for addressing these problems.

BRIEF SUMMARY

Embodiments of the present invention provide systems, methods, and apparatuses for assessing a quality of a determined shape in an image. For example, the quality can be determined by comparing two differently-determined shapes of a body tissue (e.g., organ or tumor) based on images of a patient. A first shape of the body tissue can be determined by a first shape-determining process (e.g. manual analysis by an expert), and first data can be received that defines a first boundary of the first shape. Also, a second shape of the body tissue can be determined by a second shape-determining process (e.g. shape recognition software), and second data can be received that defines a second boundary of the second shape. The shapes can then be compared to assess an accuracy of one of the shape-determining processes.

In one embodiment, an intersection of the two shapes and a union of the two shapes can be determined. A difference between the union and the intersection can be calculated, and a shape similarity metric can be computed based on the difference. In this manner, a similarity metric can be provided that determines that accuracy of the second shape-determining process relative to the first shape-determining process. To facilitate the comparison, the first shape and second shape can both be placed in a same coordinate system (also called coordinate space).

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

FIG. 9 shows a block diagram of an example computer system usable with system and methods according to embodiments of the present invention.

DETAILED DESCRIPTION

Figure 1:
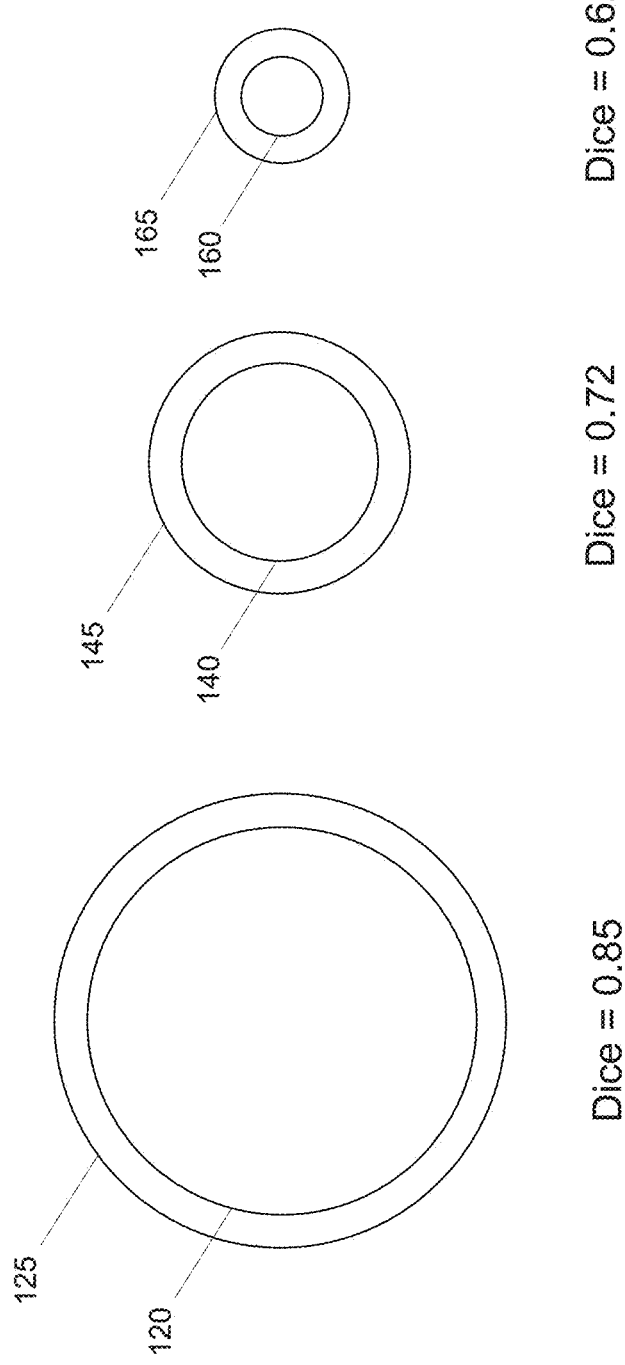
FIG. 1 shows three examples of Dice coefficients for concentric circles.

Medical imaging (e.g. CT or MRI) can be used to evaluate the shapes of certain body tissues. However, the tissue of interest can be partially blocked by other body tissue, and the image can be otherwise unclear. Some applications (e.g. radiotherapy) depend on knowing the actual shape of a tissue, so various methods have been developed for determining an actual tissue shape from an unclear medical image. For example, a radiologist may review one or more images and draw the outline of a body tissue present in the images based on past experience. However, the reliance on manual evaluation is costly and inefficient. The description includes examples for organs, but is equally applicable to any body tissue, including tumors.

Software algorithms exist for identifying shapes, but such algorithms need refinement. It can be difficult to assess an accuracy of a new or refined algorithm. Accordingly, there is a need for assessing whether a shape-determination process is accurate. Embodiments can provide a new metric that is invariant with size, and thus provide a more desirable way to assess a quality of a shape-determining process.

Accordingly, embodiments provide techniques for determining a similarity between two shapes, and thus allow assessing an accuracy of a process for determining a shape. Embodiments can place the two shapes onto a common coordinate space and determine an intersection area and union area created by the superimposed shapes. A shape similarity metric with easily interpretable units (e.g. distance units) can be determined based on a difference between the intersection and the union of the shapes. The shape similarity metric can indicate the accuracy of a shape-determining process. For example, a lesser difference between the union and intersection can lead to a lesser shape similarity metric and indicate a higher accuracy of a shape-determining process.

In some embodiments, the average distance between the outlines (boundaries) of the intersection area and union area is determined as a similarity metric. In one implementation, the distance between the intersection and the union can be directly measured at several points and then averaged. In another implementation, a distance metric can be determined based on the numerical values of the intersection area/volume and union area/volume. A normalization factor can be determined based on the compared shapes, e.g., so as to obtain a distance that is comparable across different pairs of shapes. The shapes can be overlapping shapes or non-overlapping shapes, and a shape of the body tissue may not exist from one shape-determining process. Further, embodiments can apply to two-dimensional and three-dimensional shapes, and can be expanded to include higher dimensional shapes.

I. Introduction

With the increasing importance of automatic segmentation and automatic quality control in radiotherapy, there is the need for an efficient, robust and comprehensible method of comparing different organ contour shapes that are based on medical images (e.g. CT or MRI). There is a need for an absolute shape comparison metric that can be easily interpreted, that is meaningful in a clinical context, and that is unaffected by size scaling. With such a measurement one can define a tolerance value for automatic safety checking. The current standard methods, Dice similarity and Hausdorff distance, are difficult to interpret and are often not meaningful in a clinical context. The Dice similarity is sensitive to the size of the shapes whereas Hausdorff can be dominated too strongly by individual outliers and local abnormalities.

A. Imaging

Several techniques can be used for obtaining images of various objects, e.g., diagnostic images for diagnostic purposes. For example, medical imaging techniques include CT, MIll, ultrasound, PET, and SPECT (spontaneous positron emission computer tomography). These imaging techniques can provide images of various body parts and biological tissues including glands, digestive organs (e.g., stomach or liver), bones, muscles, tendons, ligaments, cartilage, etc., collectively referred to as organs. Organs can be of any body system, such as excretory (e.g., kidneys), respiratory (e.g., lungs), etc. Typically, an organ shape is determined by identifying the organ within an image, but an organ shape can also be determined by other processes (e.g. taking a surface scan of a spectrum reflected from an organ). Embodiments described herein for comparing shapes and determining accuracy of shape-determining processes can be applied to any suitable shape-determination process. Further, the embodiments described herein can be used for comparing any type of shape, including one-dimensional shapes, two-dimensional shapes, three-dimensional shapes, and four-dimensional shapes.

B. Comparison

When a shape of an organ is determined by a new shape determination process, it is desirable to determine the accuracy of the shape, and thereby be able to evaluate the accuracy of the shape-determining process. The accuracy of a shape (and shape-determining process) can be determined by comparing the shape with a reference shape (e.g., a gold standard or other reliable shape-determining process). Accordingly, a contour comparison may be used for evaluating the quality of a segmentation algorithm, by comparing contours produced by the algorithm with the reference shape.

For example, an organ (e.g. a spleen or pancreas) may be visible in a CT image. Certain portions or boundaries of the organ may be blocked or unclear in the image. An expert radiologist may analyze the image and determine the shape and boundaries of the organ. Because an expert may have extensive experience and may be able to produce accurate and reliable shapes, the shape can be regarded as a reference shape. Alternatively, multiple experts (medical doctors, radiologists, etc.) may each draw or otherwise provide a version of the organ shape based on the image, and the shapes can be averaged to determine the gold standard. Such a reference shape can be used as a comparison/benchmark for evaluating the accuracy of shapes determined by other processes.

Besides image analysis by experts, there may be several other algorithms and processes for determining the shape of an organ that is visible in an image. For example, a resident clinician (who may be learning to draw outlines of organs based on images) can produce another version of the organ. The resident's shape can be compared against the gold standard (e.g. a shape drawn by a supervising medical doctor). This can be a quality assurance process that critiques the resident-produced shape and helps residents to improve their technique.

Automated computer-implemented algorithms may also be able to identify contours and boundaries of an organ within an image. Computer-implemented algorithms may be significantly faster than manual image analysis by an expert. Examples of alternative algorithms for determining an shape within an image are described in Dominique P. Huyskens et al., "A qualitative and a quantitative analysis of an auto-segmentation module for prostate," Radiotherapy and Oncology 90 (2009) 337-345, as well as in B. Hass et al., "Automatic segmentation of thoracic and pelvic CT images for radiotherapy planning using implicit anatomic knowledge and organ-specific segmentation strategies," Phys. Med. Biol. 53 (2008) 1751-1771. Computer-implemented algorithms could even be more reliable than a manually determined image.

In order to determine the accuracy of a new algorithm, an organ shape determined by the algorithm may be compared with a reference shape. If the shapes are similar the algorithm can be deemed accurate, while if the shapes are dissimilar the algorithm may be considered inaccurate. Once the accuracy of the new algorithm is determined, it can be compared with past algorithms to see if it is better or worse than the past algorithms. Also, it can be decided whether or not to use the algorithm in real applications. The algorithm can be changed and improved, and the algorithm can be continuously compared with a reference to measure improvement.

The accuracy metric can further be used for quality assessment. For example, if any changes are made to the algorithm, or to software that contains the algorithm, embodiments can be used again to determine a shape (based on the same image or other raw data), and the shape can be compared with a reference (which could be an old version of the algorithm). This way, the comparison and accuracy metric can be used to make sure that the algorithm is performing the same as or better than it was previously.

In some embodiments, a shape determined by applying an algorithm to an image can be compared with a shape determined by applying a previous version of the same algorithm. An accuracy metric can be determined that can show whether or not the newer version of the algorithm is better, the same, or less accurate than the previous version. The new algorithm could be faster and thus preferable, while providing a same level of accuracy. Thus, shapes determined by two different algorithms (neither being a gold standard algorithm) can be compared.

C. Dice Similarity

One well-accepted method for comparing shapes is the Dice similarity measurement. The Dice similarity measurement is a simple measurement that determines the overlapping percentage of two shape areas. A unitless metric called the "Dice coefficient" is calculated. The formula used is shown below:

$$DICE = \frac{2|A_1 \cap A_2|}{|A_1| + |A_2|}$$

The numerator multiplies the area of the intersection of the shapes by two, and the denominator is the sum of the areas of both shapes. The numerator is always equal to or smaller than the denominator, so the unitless Dice coefficient will be a number between zero and one.

An in-depth discuss of the Dice similarity measurement can be found in Dice, Lee R. (1945), "Measures of the Amount of Ecologic Association Between Species", Ecology 26 (3): 297-302. DOI=10.2307/1932409, JSTOR 1932409. A further discussion of segmentation techniques can be found in Babalola K O, Patenaude B, Aljabar P, Schnabel J, Kennedy D, Crum W, Smith S, Cootes T F, Jenkinson M, Rueckert D. (2008), "Comparison and evaluation of segmentation techniques for subcortical structures in brain MRI", Med Image Comput Assist Interv. 2008; 11(Pt 1):409-16.

FIG. 1 shows three examples of Dice coefficients for concentric circles. Circle 120 is compared against circle 125, and the dice coefficient is determined to be 0.85. Circle 140 is compared against circle 145, and the dice coefficient is determined to be 0.72. Circle 160 is compared against circle 165, and the dice coefficient is determined to be 0.62. As shown in FIG. 1, the distance between the inner circles (120, 140, 160) and their respective outer circles (125, 145, 165) is the same. However, the dice coefficient is larger for the larger circles (120, 125). This shows that the Dice coefficient is dependent on scale. Larger shapes will tend to provide a higher Dice coefficient (indicating a better match), even though, for two smaller shapes, the distance between the inner shape and outer shape is the same.

In contrast to the Dice similarity measurement, embodiments can be scale invariant. For example, an average distance between two shapes can provide a metric. The average distance between two shapes will always result in the same metric value, regardless of the size of the shapes. In addition, an easily comprehensible unit (e.g. a distance such as mm) can be provided. This can be useful in certain applications like medical imaging and determining the shape of an organ, where the error of a shape outline (in pixels or mm, for example) can be more useful than an accuracy percentage.

D. Hausdorff Distance

Another method for comparing shapes is the Hausdorff distance measurement. The Hausdorff distance is the maximum distance between the borders of two shapes.

Figure 2:
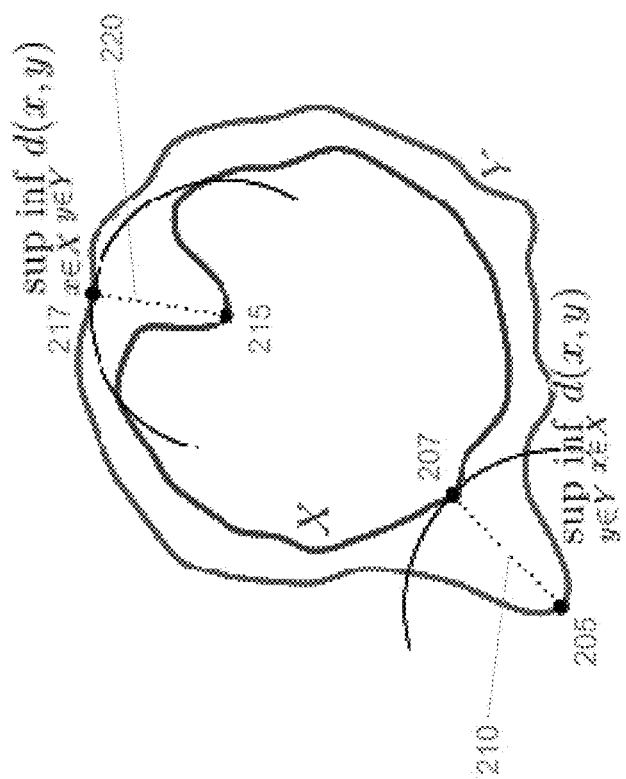
FIG. 2 shows an example of a Hausdorff distance measurement.

FIG. 2 shows an example of a Hausdorff distance measurement. To calculate the Hausdorff distance, the shortest distances to shape X from each specific point on shape Y are identified. In FIG. 2, a Hausdorff distance is shown by line 210. Line 210 shows that shortest distance between point 205 (on shape Y) and shape X is a straight line to point 207 on shape X.

The shortest distances to shape Y from each specific point on shape X are also identified. Line 220 shows the shortest distance between point 215 (on shape X) and shape Y is a straight line to point 217 on shape Y. As line 210 is larger than line 220, line 210 corresponds to the Hausdorff distance since it is the maximum of the identified shortest distances. Two shapes are considered to match well if they have a short Hausdorff distance.

A drawback of the Hausdorff distance is the dependency on a maximum distance. One outlier can dominate the comparison measure. If two shapes are nearly identical except for one outlying point or region, a large Hausdorff distance will still result and the shapes may be considered a very poor match. Further, the Hausdorff distance is not immediately evident, and locating it may require extensive analysis and measurement.

In contrast to the Hausdorff distance measurement, embodiments can be topology-independent and not dramatically affected by outlying points. In some embodiments, it is not necessary to identify a point from the first shape that corresponds to a point from the second shape. Accordingly, embodiments can provide a more accurate shape comparison tool, and be easier and faster to execute.

II. Shape Similarity

To determine a similarity between shapes, embodiments can be determining using an intersection shape and a union shape. These shapes are the same when the two shape-determining processes provide identical shapes. A difference between the intersection shape and the union shape is thus used to determine a similarity metric.

A. Difference of Union and Intersection

To determine the intersection shape and the union shape, the two shapes can be superimposing onto a same coordinate space. Once the two shapes are in the same coordinate space, a difference between the intersection shape and the union shape can be determined. The difference can be determined as a distance. For example, the average distance between the union shape and the intersection shape can be determined as the difference. Thus, the measurement of shape difference can be given as a metric with a unit of distance (e.g. cm or mm).

Figure 3:
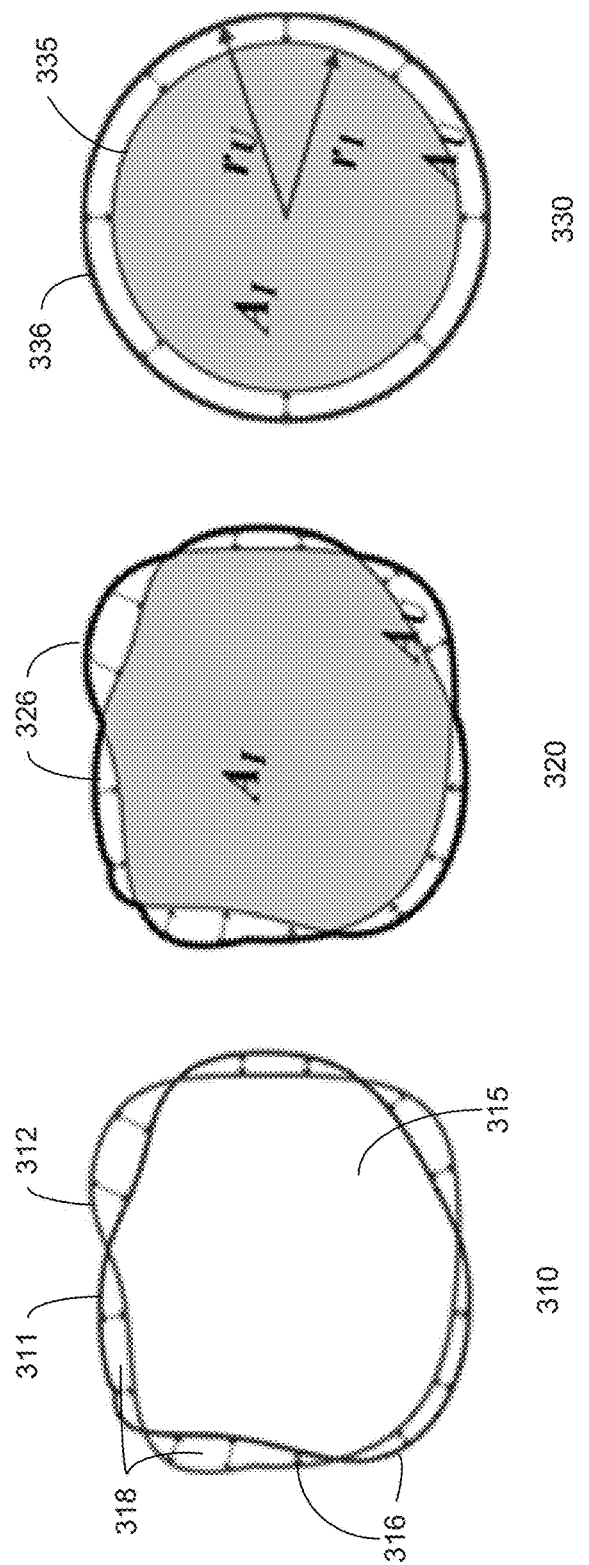
FIG. 3 shows an approximation for calculating the difference between two shapes according to embodiments of the present invention.

FIG. 3 shows an approximation for calculating a difference between two shapes according to embodiments of the present invention. The example of FIG. 3 is in two dimensions. A first shape 311 and a second shape 312 are superimposed in diagram 310. The two shapes 311, 312 are put into a same coordinate space. This may occur automatically as the two shapes may be defined from a same image, and thus the boundaries of the two shapes already exist in a same coordinate space, i.e., defined with respect to a same origin.

An intersection shape 315 corresponds to the intersection of the two shapes. A union shape 316 corresponds to the union of the two shapes. Union shape 316 includes intersection shape 315 and several non-overlapping striped regions 318. The non-overlapping regions are striped with arrows, while the intersection region is left blank.

Diagram 320 highlights the intersection area, represented by $A_I$, in gray. The union area (or the total area of the first and second shapes combined) is the entire area enclosed by the bolded outer boundary. The union area is represented by $A_U$. Area is used for this two-dimensional example.

The difference between the two shapes can be represented by the average distance between union area and the intersection area. To make the calculation of the average distance easier, the absolute value of the areas can be utilized. To demonstrate this point, the intersection shape and the union shape are respectively approximated as concentric circles 335 and 336 in diagram 330. The intersection area $A_I$, still having the same value/magnitude, is redrawn as circle 335. The union area $A_U$ also has the same value and is redrawn as circle 336. Redrawing the shapes in 320 as the circles in 330 give approximately the same outcome, and help to illustrate the use of the difference in the areas $A_U$ and $A_I$, to obtain a similarity metric.

The distance between the borders of two concentric circles 335, 336 is the same at every point, and is just the difference between the radii. Accordingly, the average distance between the union area and the intersection area is just the difference between the radii, as shown in diagram 330:

$$\bar{d} = r_U - r_I$$

Redrawing the shapes as circles is helpful because the area of a circle is a simple formula that is dependent on a distance ($A = \pi r^2$). The formula can be rearranged so that the radius is defined in terms of the area $$\left( r = \sqrt{\frac{A}{\pi}} \right).$$

Now, the area can be substituted for the radius in the above equation, creating a new equation that is more easily applied to non-circular shapes:

$$\bar{d} = r_U - r_I = \frac{1}{\sqrt{\pi}} \left( \sqrt{A_U} - \sqrt{A_I} \right)$$

The above equation was derived using the formula for the area of a circle, so the exact formula will be slightly different for other shapes. Specifically, the normalization factor $$\frac{1}{\sqrt{\pi}}$$

will be different. This will be explained in detail further below.

In order to determine the average distance between the union shape and intersection shape of any two shapes, the union area and intersection area need to be determined (as well as a normalization factor). This can be easier than directly measuring and averaging the distances at each point, although such a technique can be used. An area can be determined via a number of techniques, such as counting the pixels contained within the borders of the area or volume.

B. Method

Figure 4:
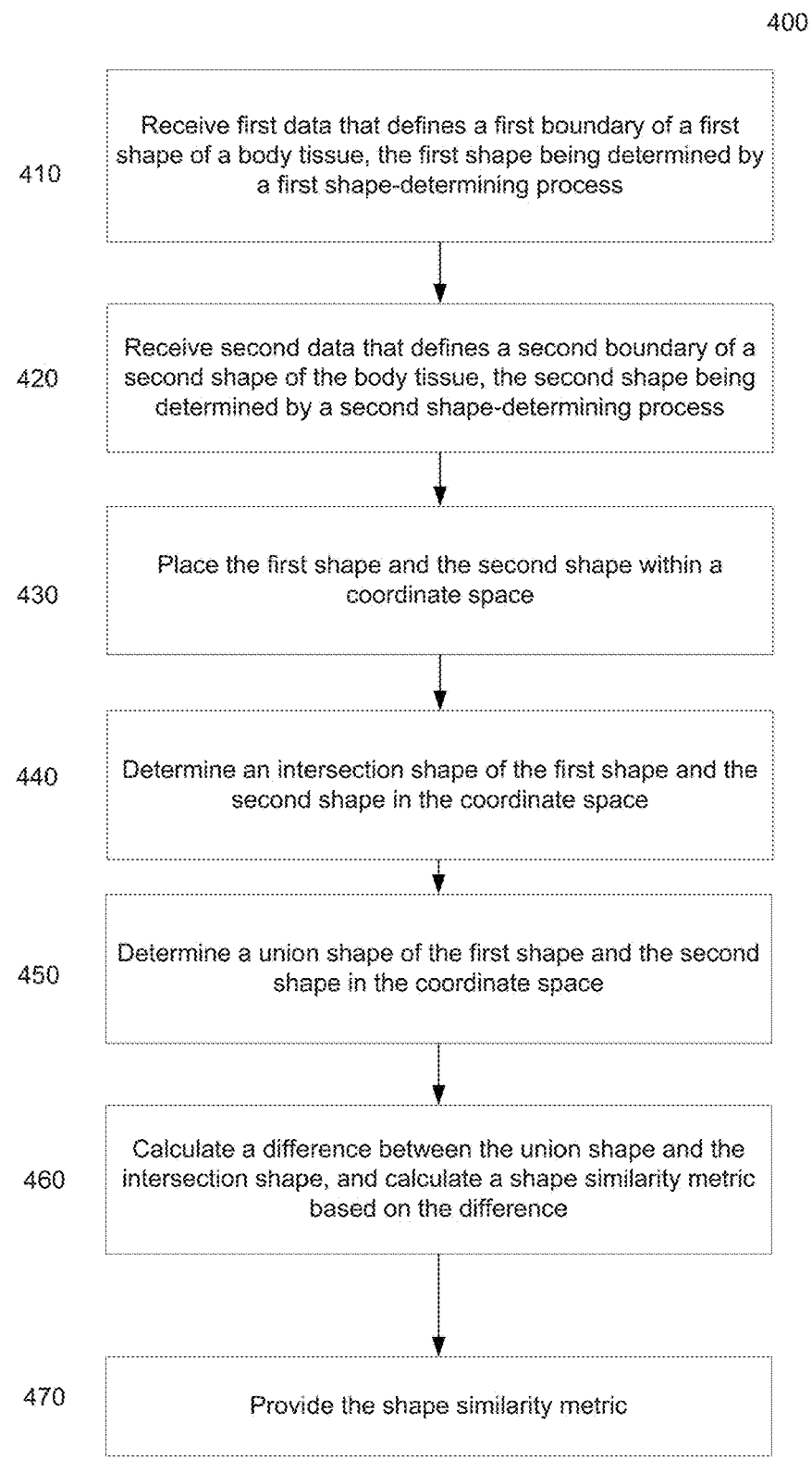
FIG. 4 is a flowchart illustrating a method for determining an accuracy of shape-determining processes for identifying shapes of a body tissue in one or more images of a patient according to embodiments of the present invention.

FIG. 4 is a flowchart illustrating a method 400 for determining an accuracy of shape-determining processes for identifying shapes of a body tissue in one or more images of a patient according to embodiments of the present invention. The method can compare any two-dimensional or three-dimensional shapes. The shapes may be shapes of a body tissue based on one or more images, including shapes of a body tissue based on a surface scan of a reflected spectrum. The one or more images and other images mentioned herein can be diagnostic image(s), such as CT, MRI, and the like. The comparison of the shapes can be used to identify the accuracy of a shape-determining process, thereby allowing improvement of the shape determining process by determining when accuracy has improved.

In block 410, first data is received that defines a first boundary of a first shape of a body tissue in at least a portion of the one or more images. The first shape may be determined by a first shape-determining process (e.g., an algorithm), and the first shape-determining process may be a standard, respected process (e.g. image analysis by an expert radiologist). Accordingly, the first shape may be a reference accepted as an accurate representation of the true body tissue shape. The data defining the boundary of the shape may be defined as a set of pixels in one or more images, a set of coordinates, or any other suitable data. The boundary can be in two dimensions or three dimensions depending on whether the shape is two-dimensional or three-dimensional.

In block 420, second data is received that defines a second boundary of a second shape of the body tissue in at least a portion of the one or more images. The second shape may be determined by a second shape-determining process, and the second shape-determining process may be a new or alternative process (e.g. a new computer analysis algorithm). The second shape may be similar to or very different than the first shape. The accuracy of the second shape-determining process may depend on how similar the second shape is to the first shape. The data defining the boundary of the shape may be any suitable data, e.g., as described herein.

In block 430, the first shape and the second shape may be placed within a coordinate space. In embodiments, the first shape and second shape may both have been determined from one image, and the first shape and second shape may be shown on the original image. A common reference point (e.g. a marker or other biological tissue) in the image may be used to overlay the first shape and second shape appropriately. Other methods for correctly overlaying the first shape and second shape may be used, such as placing the centers of both the first shape and second shape at the same point. As another example, a same reference point can be determined in two images, and shapes can be defined with respect to that same reference point.

In block 440, an intersection shape of the first shape and second shape in the coordinate space may be determined. The intersection shape may be determined manually or automatically by a computer system. The intersection shape can include the area where both the first shape and the second shape are present. A boundary of the intersection shape may be shown and/or highlighted. The boundary of the intersection shape may be comprised of various segments of the outlines of the first shape and the second shape as the first and second boundaries cross each other. Further, the area of the intersection shape may be determined. For example, the area may be determined by counting the pixels within the intersection shape, by counting larger blocks within the intersection shape, by using the curve given by the boundary of the intersection shape, or by any other suitable method.

In block 450, a union shape of the first shape and second shape in the coordinate space may be determined. The union shape may be determined manually or automatically by a computer system. The union shape can include the area where either the first shape or the second shape is present. A boundary of the union shape may be shown. The boundary may be comprised by various segments of the boundaries of the first shape and the second shape. The boundary of the union shape may define a combination shape formed by the overlaying of the first shape and second shape. Further, the area of the union shape may be determined, e.g., as described herein.

In block 460, the difference between the union shape and the intersection shape may be calculated. In some embodiments, the difference may be represented by a distance, where the distance corresponds to an average distance between the outline of the intersection shape and the outline of the union shape. The average distance may be calculated by a formula, and the formula may be based on the values of the areas of the union shape and the intersection shape. In various embodiments, the difference may alternatively be a difference in area, a difference in the square roots of the areas, a measurement of the percentage of the union shape that is filled by the intersection shape, or any other suitable value or metric. The difference may be calculated manually or calculated automatically by a computer system.

The value of the difference between the union shape and the intersection shape may be used to compute a shape similarity metric. The shape similarity metric may be the same as the difference value, or it may be based on the difference value. For example, the shape similarity metric may be the difference value multiplied by a normalization factor.

In some embodiments, the difference between the union shape and the intersection shape may be calculated by computing an intersection size of the intersection shape and a union size of the union shape. The intersection size can be subtracted from the union size to obtain the difference.

In block 470, the shape similarity metric can be provided. The accuracy of the second shape-determining process may be determined based on the shape similarity metric. In embodiments, the second shape-determining process may be deemed accurate if it can produce a second shape similar to the first shape produced by the first shape-determining process. For example, the metric may indicate that the second shape-determining process was accurate if the average distance between the union shape and intersection shape was small, or if the second shape is otherwise similar to the first shape.

Embodiments can determine a distance metric (e.g. the average distance between the intersection shape boundary and the union shape boundary) instead of a proportional difference. Accordingly, if a distance metric value is determined for a comparison of two smaller shapes and another distance metric value is determined for a comparison of two larger shapes, the two distance metric values can be similar if the differences between the intersection shapes and the union shapes are similar.

Embodiments can compare three-dimensional shapes by breaking down three-dimensional shapes into a number of two-dimensional (2D) slices. For example, embodiments can compare corresponding 2D slices from a reference three-dimensional shape and a test three-dimensional shape. Corresponding 2D slices can be determined based on a scan, as many imaging techniques perform 2D scans and create a 3D image from the 2D scans. A shape similarity metric (e.g. average distance) can be determined for each slice comparison, and a total shape similarity metric can be determined by averaging the slice-specific shape similarity metrics. The slices may be different sizes, so the average may be weighted accordingly. For example, slices of greater area or circumference may be given more weight when averaging. In another embodiment, the shape similarity metrics are not dependent on size, and are not weighted differently.

In other embodiments, the shape similarity metric can be used to determine the most similar atlas(es) for a given patient image. In one implementation, this determination can be made based on a comparison of the body contour of the patient with the body contour of the atlases in some region of interest. For example, the body contour can be for a leg, an arm, a torso, a hand, a foot, and other body contours. Finding a similar atlas can be important to obtain reasonable segmentation results. For example, an atlas can be used to segment the image into different body tissues, and thus a similar atlas can be important to accurately identify a shape of a body tissue. Comparisons of multiple body contours can be used to determine the most similar atlas(es).

Further examples for using the shape similarity metric are as follows. The shape similarity metric can be used in searching knowledge databases, e.g., to find a similar target volume or organ shape in a database of patients already treated. Once the similar target volume or organ shape is identified, information about the similar shape can be used for a current patient. For example, a treatment plan for the other patient can be used for the current patient.

The shape similarity metric can be used in checking quality of manual contouring by doing a quick check with an average shape or one predicted by statistics. Such a process could be used in training, e.g., for improving the manual contouring skill of a radiologist.

The shape similarity metric can be used for training model-based methods when there is a need to tune parameters of a model for it to best predict the shape of a certain organ.

III. Determining Intersection and Union

A shape in an image can be defined by boundary outlines. In one implementation, the boundaries can be represented by a function. In another implementation, a shape boundary can be defined by a set of pixels within the shape boundaries. A size (e.g., area or volume) of a shape can be determined by identifying the number of pixels within the shape. An absolute value can be obtained by knowing the scale for a pixel size. Alternatively, the size of the shape can be determined by integrating the function that defines the shape boundaries, e.g., counting blocks within the boundary.

A. Intersection

In two dimensions, the intersection of two shapes can be defined as the area where both shapes are present. In embodiments, the intersection can be determined by identifying the pixels that are associated with both of the two shapes. These pixels can then be associated with the intersection shape. The boundary of the intersection can include segments of the outlines of both shapes. Accordingly, the intersection outline can be determined by tracing or highlighting the outline of either the first shape or second shape, whichever outline is inside the other, e.g., closer to a center point.

B. Union

The union of two shapes can be defined as the combination of the two shapes. In embodiments, the intersection can be determined by identifying the pixels that are associated with either of the two shapes. These pixels can then be associated with the union shape. For example, referring back to FIG. 3, the striped regions 318 of diagrams 310-330 contain the pixels that are within one shape, while the gray regions contain the pixels that are within both shapes. The union area is the combination of both the gray and striped areas, and the outline of the union area is bolded in diagram 320 and diagram 330. Alternatively, an image with overlapped shapes can be analyzed, and the union area can be manually identified. The outline of the union can include segments of the outlines of both shapes. Accordingly, the union boundary can be determined by tracing or highlighting the boundary of either the first shape or second shape, whichever outline is further from the center at that point.

C. Circumference and Surface Area

The circumference of a shape is used in some embodiments to determine the similarity metric. The circumference can be determined using similar information as the area/volumes. For example, pixels that define a boundary of a shape can be counted and a scale of a pixel used to determine circumference. If the shape was defined with a function, the function can be used to determine the circumference. For three-dimensional shapes, the surface area of a shape can be determined in a similar manner.

IV. Calculating Difference

As mentioned above, various embodiments can compute the difference between the union shape and the intersection shape using selected points or by determining an area/volume. The use of areas/volumes can provide certain advantages, such as accuracy and ease of computation.

A. Average of Separate Distance Values

There are multiple ways to determine the average distance between a union shape and an intersection shape. For example, several measurements of the distance between the union shape and intersection shape can be taken at different points, and then the measurements can be averaged. Referring back to FIG. 3, the striped regions 318 in diagrams 310, 320, and 330 are striped by a number of arrows. These arrows can be specific measured distances between the union shape and the intersection shape that can be averaged to determine the average distance. As shown, a sampling of distances can be measured instead of measuring the distance between every pair of corresponding points between the union shape and intersection shape. The distance can be measured for every point on the intersection outline along a given interval (e.g. every tenth pixel along the intersection outline or a point every 2 mm along the intersection outline).

Measuring and averaging several specific distances can have a number of drawbacks. For example, it can be a laborious and imprecise process. Measurements are taken between two specific points on the intersection boundary and the union boundary, but it may be unclear which point on the union boundary corresponds to any given point on the intersection boundary, and vice versa. In some embodiments, for a selected point on the intersection boundary, the closest point on the union boundary is taken as the corresponding point. Corresponding points may be the same point or area on the organ (just shown in a different position), or they may simply be nearby points used for calculating the distance.

In some embodiments, instead of choosing the closest point, a corresponding point on the union boundary may always be in a certain direction or location relative a selected point on the intersection outline. For example, a center of the union shape can be determined (e.g. a center of mass), and a corresponding point on the union boundary may be found radially outward from a selected point on the intersection boundary, directly away from the center. In another example, the distance may be measured from a selected point on the intersection boundary to a point on the union outline that is found 45 degrees from the horizontal (either in the first quadrant or in the third quadrant). A number of other methods can be used for identifying corresponding points.

B. Determining Area

Areas and volumes can be used to determine the difference between the union and intersection shapes. There are various ways to determine the areas of a union shape and an intersection shape. Methods for determining the boundaries and/or pixels of a union shape and an intersection shape are described above. Once the boundary of a shape is known and/or the pixels within the shape are known, the boundary can be integrated and/or the pixels can be summed. Numerical integration or manual counting can be used. In embodiments, there may be an uncertainty in the boundary lines of a shape (e.g. ±4 mm). In this case, the value of the area may be given with a corresponding uncertainty value (e.g. ±16 mm$^2$).

An image containing a shape can be calibrated in order to determine the size of a shape distance units (e.g. cm or mm). For example, a reference object of known size may be included in the object. The area of the reference object in the image can be determined (e.g. the number of pixels used for the reference object or the scaled length and height of the object in the image), and a scaling factor for the image can be determined based on the true size of the reference object and the image size of the reference object. In some embodiments, a size (e.g. length, width, or area) per pixel may be determined. A scale may be determined (e.g. 2 cm in image=10 cm in reality), and the scale may be displayed on the image.

Once a scale is determined, the actual areas of the intersection shape and union shape can be determined (although area/volume in units of pixels can be used). If the pixels contained in the shapes have been determined and the scale is a known size per pixel (e.g. 2 mm$^2$/pixel), the area of a shape (in pixel units) can be multiplied by the scale to find the true area of the shape (in mm$^2$ units). With shape areas given in real-world distance units, the average distance between the intersection shape and union shape can be determined in real-world distance units.

As explained above, the average distance can be determined based on the areas of the intersection shape and the union shape. Specifically, the formula below can be used. For the circle example, the factor $$\frac{1}{\sqrt{\pi}}$$

was used. This shape-dependent factor can be generally referred to as a normalization factor k, where the similarity metric is provided by: $\bar{d}=k(\sqrt{A_U}-\sqrt{A_I})$, where $A_U$=union area, $A_I$=intersection area. Methods for determining k values for any shape are discussed below.

C. Area Vs. Average Distance

Figure 5:
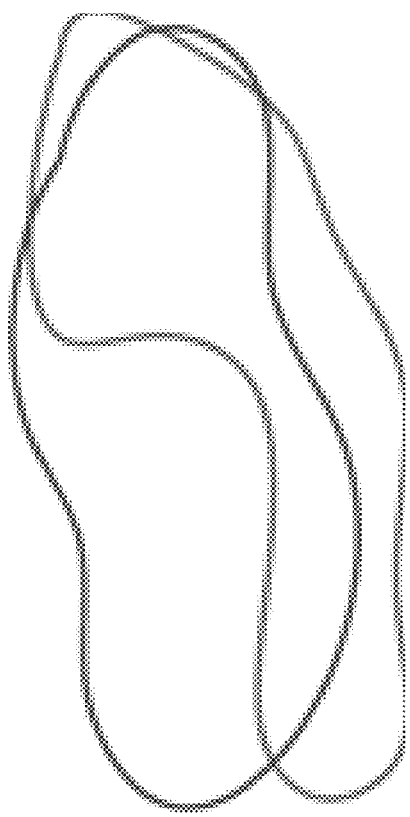
FIG. 5 shows an example where it is unclear which points are corresponding between two shapes.

In some situations, it can be difficult to directly measure the average distance using a distance between corresponding points. It can be unclear which points of one shape correspond to which points of a compared shaped. Similarly, it can be unclear which point of a union shape corresponds to a selected point on an intersection shape. FIG. 5 shows an example where it is unclear how to match points on two shapes. The shapes have dissimilar curvature in some areas, and some parts of the outline are not close. If corresponding points cannot be identified, the distance between the shapes cannot be accurately measured.

As explained above, the closest point on the union outline can be taken as the corresponding point to an intersection shape, or there may be a preferred direction for measurement. However, the points found with these methods may not provide actual corresponding points. For example, some forms of curvature can result in the corresponding point actually being the further point away.

Accordingly, using the areas of the shapes to determine the average distance can be an easier and more reliable method. Calculating via areas is often more accurate, easy, and fast when shape outlines/contours are larger and more complex. Also, in practice, small shape areas often have dramatic curves and changes in topology, so calculating average distance via areas can be better suited in those situations as well.

In another example, calculating via area can be used in situations where two shapes are being compared against one shape (or other mismatched numbers of shapes are being compared). For example, one doctor may draw an outline of two connected bones using one continuous outline (i.e. one shape). Another doctor may draw two separate outlines for the two bones. Distances cannot be directly measured because corresponding points cannot be accurately determined between one shape and a corresponding set of two shapes. Instead, the group of two outlines can be considered to be one shape, and their areas can be added. The overlap between the areas of the one shape (first drawing) and the area of the two shapes (second drawing) can still be calculated. Accordingly, the intersection area and the union area can still be calculated. Thus, the areas of the shapes can be used to compare the quality of the doctors' drawings.

D. Other Contexts

The shape comparison measurement and shape similarity metric can be used in a number of contexts. Body tissue imaging is primarily discussed herein, but the embodiments can be applied to any context where 2-dimensional or 3-dimensional shapes (especially natural shapes) are compared. The method can be used where any kind of deformation analysis is taking place, or where a change of shape is observed. Embodiments can be especially useful where one is interested in producing an interpretable unit (e.g. a distance metric). For example, embodiments can be applied to pathology imaging, surgery planning, geographic information systems, meteorology, astronomy, remote sensing, and any other suitable application.

Embodiments can be extended to 4-dimensional shape comparisons as well. For example, an average distance for a changing 3-dimensional shape can be determined once per a given time interval (e.g. a distance can be determined for every 5 seconds), and then the measurements can be averaged.

Some embodiments can be independent of shape location, and thus shapes can be compared that do not overlap at all. For example, the difference (average distance) of two identical circles would be zero (i.e. they are measured to be identical) even if they are in entirely different locations.

V. Computing Similarity Metric

As described herein, the shape similarity metric can be the difference value, but can also include a normalization factor. In one aspect, the normalization factor can compensate for different shapes, so that the similarity can be consistently determined. For example, one shape might be circular, but the other shape might be oblong, and a strict comparison of areas might provide inconsistent results. Thus, the normalization factor is based on a property of the shapes, such as a circumference or surface area, which can convey information about a size, form, shape factor, or curvature of a shape.

A. Normalization Factor (Circle)

Referring back to FIG. 3, it was found the average distance can be given by the formula:

$$\bar{d} = r_U - r_I = \frac{1}{\sqrt{\pi}}(\sqrt{A_U} - \sqrt{A_I})$$

Accordingly, the normalization factor for a circle is $$\frac{1}{\sqrt{\pi}}.$$

The square root is taken of the areas, which results in a dimension of distance. In other embodiments, the area can be used with an exponent of 1, or other value.

B. Normalization Factor (General)

For non-circular shapes, a different factor k that depends on the shape is introduced: $\bar{d}=k(\sqrt{A_U}-\sqrt{A_I})$, where $A_U$=union area, $A_I$=intersection area.

An analysis of a large number of human organ contours has shown that k can be well approximated with the formula:

$$k \approx \frac{2\sqrt{A}}{C} \quad A = \text{area}, C = \text{circumference}$$

This approximation treats random shapes similarly to a circle, and experimental results have shown that it is a very good approximation that is suitable for practical uses. In this formula, k is based on the area and circumference of the original shape (not the intersection shape or union shape). Methods for determining the area and circumference of shape were discussed above. Thus, if these quantities are known, an approximation of the normalization factor k can be determined. Since the similarity metric is based on k and the area values, the similarity metric can be determined for any compared shapes based on the areas and the circumferences of the original shapes and the areas of the intersection shape and union shape.

The above approximation for the normalization factor k can be tested by plugging in the formulas for the area and circumference of a circle ($A=\pi r^2$, $C=2\pi r$). The square root of the area reduces so that the numerator is $2\sqrt{\pi}r$, and the denominator of $2\pi r$ cancels the 2 and r in the numerator. With the radius variable eliminated and constants reduced, only the constant $$\sqrt{\frac{1}{\pi}}$$

remains. This is the same k value that was determined above for concentric circles. A more general formula can be determined by substituting shape-specific parameters for k.

Figure 6:
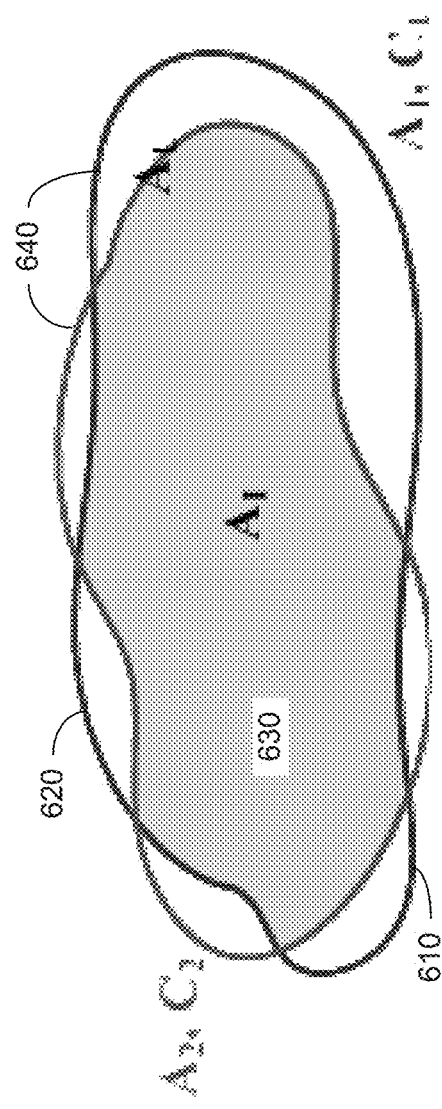
FIG. 6 shows two shapes with random curvature to illustrate a general difference formula according to embodiments of the present invention.

FIG. 6 shows two shapes with random curvature to illustrate a general difference formula according to embodiments of the present invention. A first shape 610 and a second shape 620 are shown in a common coordinate space. The two shapes, when overlaid, create two new shapes:

$A_I = A_1 \cap A_2$ and $A_U = A_1 \cup A_2$. The intersection shape 630 corresponds to points within both shapes, and union shape 640 corresponds to points within either shape. $A_I$, as explained above, can be described as the intersection area of a first shape $A_1$ and a second shape $A_2$. $A_U$, as explained above, can be described as the union area of the first shape $A_1$ and the second shape $A_2$.

Two parameters for each shape, $A_1$ and $A_2$, are considered: $A_i$=area and $C_i$=circumference.

When comparing two different shapes, the normalization factor k can be equal to the average of the normalization factors k from each of the two shapes. Thus, a general k for comparing two shapes is:

$$k = \frac{k_1 + k_2}{2} \approx \left( \frac{\sqrt{A_1}}{C_1} + \frac{\sqrt{A_2}}{C_2} \right)$$

$A_{1/2}$ = area, $C_{1/2}$ = circumference

Accordingly, substituting this general k provides a generalized formula for the average distance between the union shape and intersection shape (where the union shape and intersection shape are based on two overlapping shapes):

$$\bar{d} = \frac{k_1 + k_2}{2}(\sqrt{A_U} - \sqrt{A_I}) = \frac{\left(\frac{2\sqrt{A_1}}{C_1} + \frac{2\sqrt{A_2}}{C_2}\right)}{2}(\sqrt{A_U} - \sqrt{A_I})$$
$$= \left( \frac{\sqrt{A_1}}{C_1} + \frac{\sqrt{A_2}}{C_2} \right)(\sqrt{A_U} - \sqrt{A_I})$$

Written plainly, the formula for the difference between two overlapped shapes is given by:

$$\bar{d} = \left( \frac{\sqrt{A_1}}{C_1} + \frac{\sqrt{A_2}}{C_2} \right)(\sqrt{A_U} - \sqrt{A_I})$$

VI. Single or Non-Overlapping Shapes

Embodiments can also be applied to scenarios where the two shapes are not overlapping, which can include when one shape does not exist. In such situations, the similarity may be quite large, but at least a metric can be obtained. And, the high value can be a signal that something has gone wrong.

A. Single Shape

When comparing two shapes, sometimes only one shape will be present. This may happen when one of the shape-determining processes malfunctions or is very inaccurate. A shape-determining process may falsely determine that there is no shape when there actually is a shape, it may determine that there is a shape when there actually is no shape, it may determine that the shape location is elsewhere (e.g. out of the image area), or it may determine that the shape is small enough to degenerate to a single point with an effective area of zero.

In the case of a single shape, there is no value for the second area and circumference (or the area and circumference can both be taken as zero). It follows that the union area is just the area of the single shape, and the intersection area is zero. The normalization factor is dependent on the shapes, e.g., an inverse of a circumference. Since there is only one shape (not two different shapes), the normalization factor is expressed as:

$$k \approx \frac{2\sqrt{A}}{C}$$

Accordingly, the difference formula is reduced as follows:

$$\bar{d} = \frac{2\sqrt{A}}{C}\sqrt{A} = \frac{2A}{C}$$

Thus, for a single shape that is being compared to a non-existent shape, the formula is reduced to:

$$\bar{d} = \frac{2A}{C}$$

For a single shape that is a circle, $$\bar{d} = \frac{2A}{C}$$

reduces to $\bar{d}=r$, the difference from the boundary of the shape to the center. This distance is greater than any possible average distance that could result from having another shape that is smaller than the present shape, which demonstrates that there indeed was a poor match (a real shape is not very similar to a non-existent shape).

B. Non-Overlapping Shapes

For some measurements, two shapes will be present but non-overlapping. Since the two shapes do not overlap, they are considered to be different, non-corresponding shapes. In this case, the similarity metric for each individual shape can be interpreted as the average distance from the boundary to the center of the shape (i.e. the average radius). In order to transform the shape into a point, the outline of the contour needs to be moved by this average distance. If one shape were transformed into a point, the single-shape scenario (discussed above) would occur. Accordingly, for non-overlapping shapes, the average distance can be calculated for each shape separately as if it were a single-shape scenario (as shown above), and the average distance for the union shape can be interpreted as the average of the two single-shape distances. The formula is derived as follows:

$$\bar{d} = \frac{\bar{d}_1 + \bar{d}_2}{2} = \frac{\left(\frac{2A_1}{C_1} + \frac{2A_2}{C_2}\right)}{2} = \frac{A_1}{C_1} + \frac{A_2}{C_2}$$

For two circles, this formula reduces to $$\bar{d} = \frac{r_1 + r_2}{2}.$$

Thus, the distance metric for two non-overlapping circles will always be smaller than the distance metric for the larger circle taken as a single shape. This makes sense, because two non-overlapping shapes are arguably more similar than any single shape is to a non-existent shape.

C. Method

Figure 7:
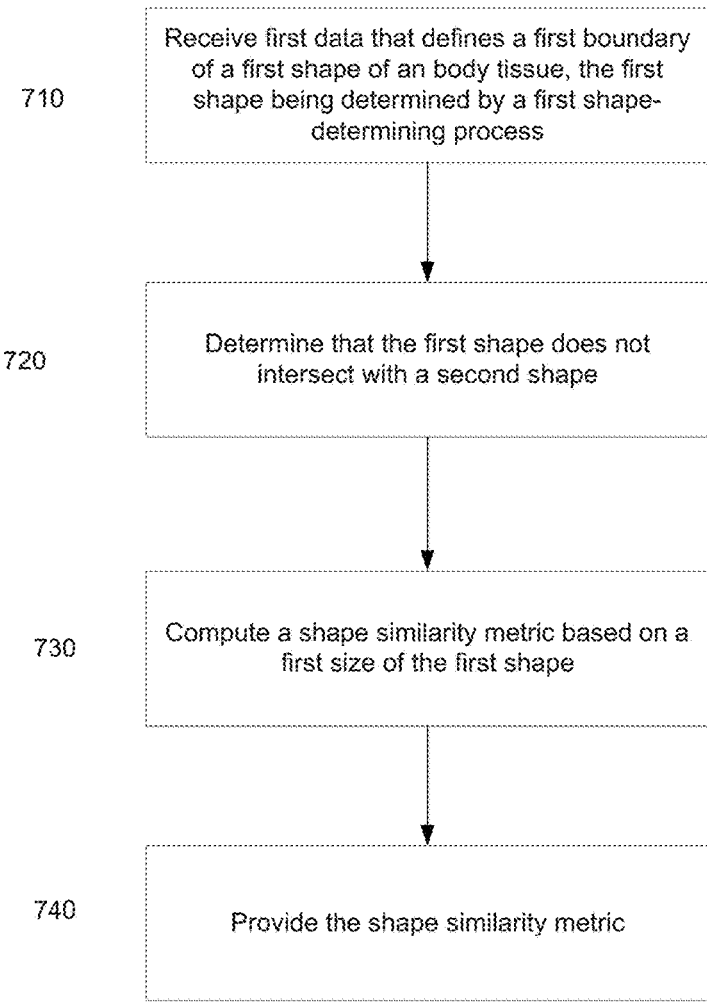
FIG. 7 is a flowchart illustrating a method for determining an accuracy of a shape-determining process, where there is no overlapping of shapes according to embodiments of the present invention.

FIG. 7 is a flowchart illustrating a method 700 for determining an accuracy of a shape-determining process, where there is no overlapping of shapes according to embodiments of the present invention. Method 700 can compare any two-dimensional or three-dimensional shapes. The shapes may be shapes of a body tissue based on an image, including shapes of a body tissue based on a surface scan of a reflected spectrum or shapes determined by any other suitable imaging method. One or more of the blocks or steps in the method may be performed by a computer system.

In block 710, first data is received that defines a first boundary of a first shape of a body tissue in at least a portion of the one or more images. Block 710 may be performed in a similar manner as described above. For example, the first shape may be determined by a first shape-determining process, and the first shape-determining process may be a standard, respected process (e.g. image analysis by an expert radiologist). Accordingly, the first shape may be a reference accepted as an accurate representation of the true body tissue shape. Alternatively, the first shape may be a new or alternative process (e.g. a new computer analysis algorithm). The data defining the boundary of the shape may be an image, a set of coordinates, or any other suitable data.

In block 720, it may be determined that the first shape does not intersect with a second shape. For example, there may not be any other shapes, or another shape may be located elsewhere within or outside of an image or coordinate space. If there is another shape, it may be determined that no image pixels are associated with both shapes, or it may be determined that the curves defined by the boundaries of the shapes do not intersect.

In block 730, a shape similarity metric may be computed. The shape similarity metric may be computed by determining a size of the first shape. The size of may be determined by multiplying an area or volume of the first shape by a normalization factor for the shape. For example, the area of the shape may be found by determining the number of pixels within the area, and the area may be multiplied by a scaling factor to give the size of the shape in real-world units.

If the size is an area, the square root of the area may be determined, and the result may be multiplied by a constant based on the shape (e.g.

$$\sqrt{\frac{1}{\pi}}$$

for a circle). The result may be another size with distance units (e.g. cm or mm), which may be the shape similarity metric. In some embodiments, the shape similarity metric may be the same as the size, or it may be based on the size (e.g. the shape similarity metric may be the size multiplied by a normalization factor). Any suitable formula may be used in determining the size and/or the shape similarity metric, and a formula may be based on the shape, e.g., as described above.

In some embodiments, a second shape does exist. In such an embodiment, second data defines a second boundary of the second shape of the body tissue. The second shape can be determined by a second shape-determining process. The first shape and the second shape can be placed within a coordinate space. The shape similarity metric can be computed by determining a second size of the second shape. The second size can be determined by a multiplication of an area or a volume of the second shape by a second normalization factor for the second shape. A sum including the first size and the second size can then be computed.

In block 740, the shape similarity metric is provided. An accuracy of the first shape-determining process may be determined based on the shape similarity metric. In embodiments, a lesser shape similarity metric can indicate a more accurate first shape-determining process. Embodiments can determine a distance metric instead of a proportion metric. Accordingly, the metric can have values other than zero. The shape similarity metric for the first shape and the second shape to another shape similarity metric of a different pair of shapes for determining a relative accuracy.

Embodiments can also analyze three-dimensional shapes by breaking down three-dimensional shapes into a number of two-dimensional slices. A shape similarity metric (e.g. distance) can be determined for each slice comparison, and a total shape similarity metric can be determined by averaging the slice-specific shape similarity metrics. The slices may be different sizes, so the average may be weighted accordingly. For example, slices of greater area or circumference may be given more weight when averaging.

VII. Identifying Treatments Information for Similar Patients

The similarity metric can also be used to identify similar body tissues (organs or tumors) in other patients, and then use treatment information from a patient with a similar body tissue.

Figure 8:
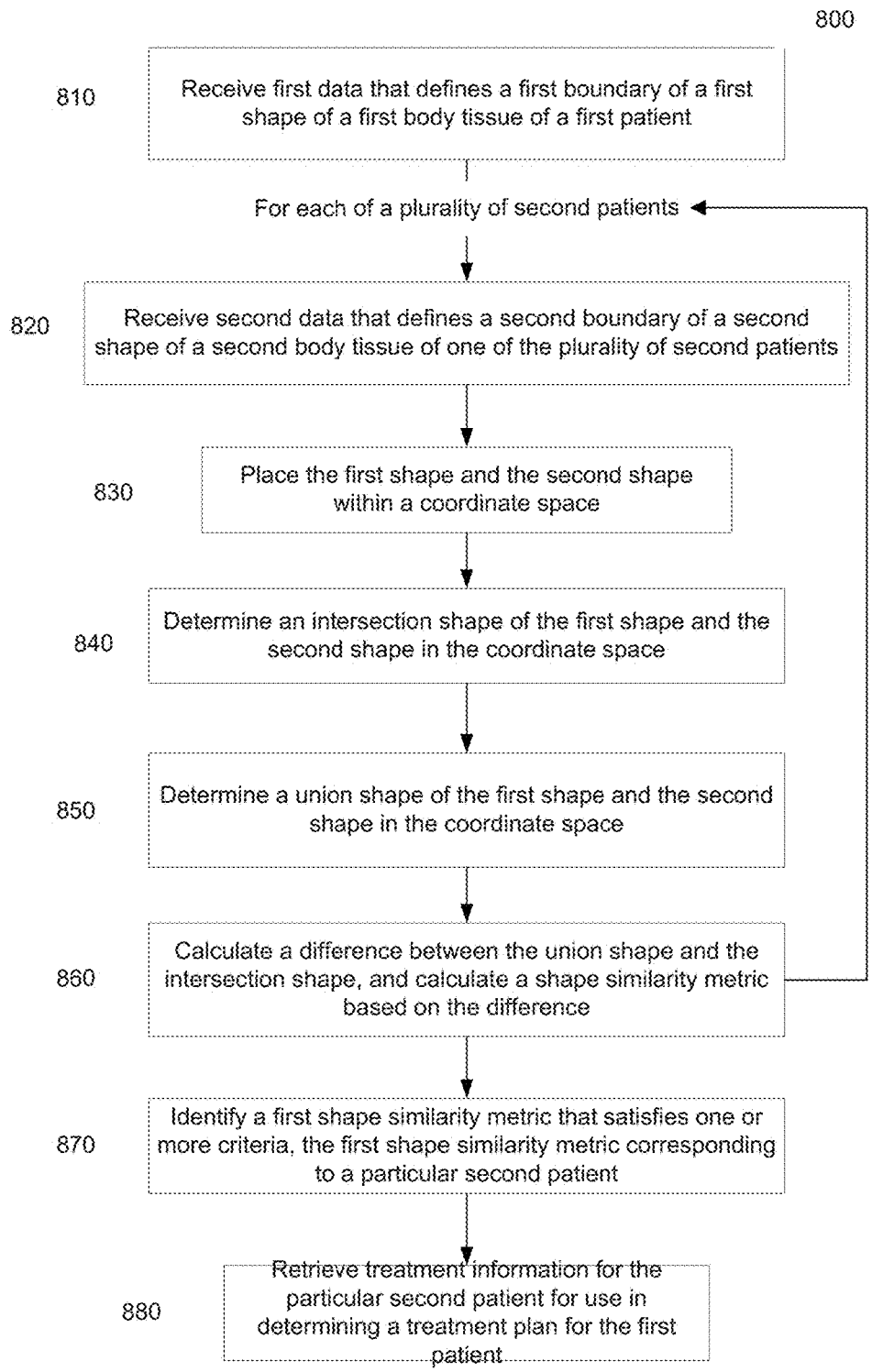
FIG. 8 is a flowchart illustrating a method of comparing shapes of body tissues in images of patients according to embodiments of the present invention.

FIG. 8 is a flowchart illustrating a method 800 of comparing shapes of body tissues in images of patients according to embodiments of the present invention. Method 800 can be performed. Method 800 can compare any two-dimensional or three-dimensional shapes of various patients. The shapes may be shapes of body tissues based on images, including shapes of body tissues based on surface scans of reflected spectrums or shapes determined by any other suitable imaging method. One or more of the blocks or steps in the method may be performed by a computer system.

At block 810, first data is received that defines a first boundary of a first shape of a first body tissue of a first patient. Block 810 may be performed in a similar manner as block 410 of FIG. 4. The first data can be determined based on one or more images of the first patent.

Blocks 820-860 can be performed for each of a plurality of second patients.

At block 820, second data is received that defines a second boundary of a second shape of a second body tissue of one of the plurality of second patients. The first shape and the second shapes can be determined using a same shape-determining process or different same shape-determining processes. Block 820 may be performed in a similar manner as block 420 of FIG. 4. The second data can be determined based on one or more images of the one of the plurality of second patients.

At block 830, the first shape and the second shape may be placed within a coordinate space. Block 830 may be performed in a similar manner as block 430 of FIG. 4. Placing the first shape and the second shape within the coordinate space may include aligning the first shape and the second shape. For example, the center of mass of each can be aligned. In other embodiments, the objects can be aligned to another point of reference, e.g., a particular body part, such as a spine. An alignment to a body outline can also be performed.

At block 840, an intersection shape of the first shape and second shape in the coordinate space may be determined. Block 840 may be performed in a similar manner as block 440 of FIG. 4.

At block 850, a union shape of the first shape and second shape in the coordinate space may be determined in the coordinate space. Block 850 may be performed in a similar manner as block 450 of FIG. 4.

At block 860, the difference between the union shape and the intersection shape may be calculated, and the value of the difference between the union shape and the intersection shape may be used to compute a shape similarity metric for the given second patient. Block 860 may be performed in a similar manner as block 460 of FIG. 4.

At block 870, a first shape similarity metric is identified that satisfies one or more criteria. The first shape similarity metric corresponds to a particular second patient. The first body tissue and the second body tissues are of a same type. For example, the two body tissues may both be a particular organ, such as a liver, heart, or brain. As another example, the two body tissues may be both be a tumor, which may be in contact to a same type of organ.

In one example, the one or more criteria can specify that the highest shape similarity metric is to be selected. In another example, a set of the shape similarity metrics of the plurality of second patients that satisfy the one or more criteria can be identified. For instance, the one or more criteria can include a threshold value for the shape similarity metrics, and the set would correspond to the shape similarity metrics that exceed the threshold value. The first shape similarity metric can be selected from the set of the shape similarity metrics. Such a selection can include identifying the particular second patient corresponding to the first shape similarity metric based on treatment outcomes for the second patients whose shape similarity metrics satisfy the one or more criteria.

At block 880, treatment information for the particular second patient is retrieved for use in determining a treatment plan for the first patient. Since the corresponding second patient is known for each of the similarity metrics, the particular second patient can be determined for the first shape similarity metric. For example, each second patient can have a patient ID, and that patient ID can be stored in association with each similarity metric. When the first similarity metric is chosen, the corresponding patient ID can be used to retrieve the treatment information for the particular second patient, e.g., using a database query using the patient ID.

As examples, the treatment information can include one or more of: a geometry of a radiation beam, a dosage of the radiation beam, and a number of sessions for treatment using the radiation beam. When the first body tissue is a tumor, the treatment information can prescribe how radiation is to be applied to the tumor.

Embodiments can also determine the treatment plan for the first patient based on the treatment information. For example, the values from the other patient can be used as an initial value in an optimization process, e.g., as described in U.S. Patent Application Publication 2015/0095044 entitled "Decision Support Tool For Choosing Treatment Plans," by Hartman et al.; and U.S. Patent Application Publication 2015/0095043 entitled "Automatic Creation And Selection Of Dose Prediction Models For Treatment Plans" by Cordero Marcos et al, which are incorporated by reference in their entirety. Embodiments can also perform the treatment plan using a radiation beam.

In some embodiments, similarity metrics can be determined for multiple organs/tumors. And, a statistical value for the similarity metrics can be used to select a second patient that corresponds to the first patient. For example, an average or sum of the similarity metrics can be used to determine an optimal second patient whose treatment information can be used to determine a treatment plan for the first patient.

As an example of method 800, a new patient can be scanned and a shape can be determined for the patient's liver. The shape can then be compared to a database of liver shapes for patients who have had a treatment plan determined, and who may have had at some treatment already. A top similarity metric can be determined for a liver in the database. The top similarity metric may be the very highest or satisfy some criteria, such as top 5% or within a specified amount of the highest, and the like.

An outcome of patients can also be used. For example, a group of patients that have a similarity metric above a threshold can be identified. And, a patient with the best outcome can be selected. Treatment information can then be determined for the selected liver in the database.

Examples of such treatment information are as follows. The geometry of the radiation beam can be used to determine how to miss an organ or how to focus on a tumor. The dosage can be used to ensure a sufficient dosage is used to kill the tumor and not damage organs. The dosage could be a mean dosage and a volumetric dosage. A number of sessions (fractions) of treatment can be specific for the treatment information of the other patient. Once the treatment information is obtained from the similar patient, the treatment information can be used to tailor a treatment plan for the specific patient.

VIII. Three-Dimensional

It may be desirable to compare two shapes that are three-dimensional. An analogous similarity metric can be provided to describe the difference between the shapes. The shapes can be superimposed on the same coordinate space, and an intersection volume and union volume can be determined. Accordingly, an average distance from the surface area of the intersection volume to the surface area of the union volume can be determined.

As described above, the above-described method for determining the difference between two-dimensional shapes can be extended into three dimensions. A three-dimensional shape can by separated into a number of two-dimensional shapes, or slices. The slices each have a certain area and, when stacked, can re-create the original three dimensional shape with a certain volume. For example, a CT scan can produce a number of two-dimensional slices that represent a three-dimensional shape. A shape similarity metric (e.g. average distance) can be determined for each slice comparison, and a total shape similarity metric can be determined by averaging the slice-specific shape similarity metrics. The slices may be different sizes, so the average may be weighted accordingly. For example, slices of greater area or circumference may be given more weight when averaging.

Alternatively, two-dimensional slices can be used to determine the volume of a three-dimensional shape. The area of each slice can be determined as described above (e.g. counting pixels), and the volume can be determined by multiplying the total area of all the slices by the thickness of each slice. Knowing the volume, a formula for comparing three-dimensional shapes that is analogous to the above-described formula can be used.

The volume of a three-dimensional shape is associated with the radius of the shape, similarly to how the area of a two-dimensional shape is associated with the radius. For example, for a circle, $A=\pi r^2$, and for a sphere (the three-dimensional extension of a circle), $$V = \frac{4}{3}\pi r^3.$$

The radius of a sphere can be written as:

$$r = \sqrt[3]{\frac{3V}{4\pi}}$$

Alternatively, through a similar derivation process as shown for two-dimensional shapes, it can be shown that the distance between the surface areas of concentric spheres is given by:

$$\bar{d} = r_U - r_I = \sqrt[3]{\frac{3}{4\pi}} \left( \sqrt[3]{V_U} - \sqrt[3]{V_I} \right)$$

The above formula is similar to the two-dimensional formula, but the cube root of the volume is used instead of the square root of the area, and the normalization factor k is different.

Shown plainly, the formula for calculating the average distance between the surface areas of two three-dimensional, volumetric shapes can be given by: $\bar{d}=k(\sqrt[3]{V_U}-\sqrt[3]{V_I})$, where $V_U$=union volume, $V_I$=intersection volume.

The approximation of the shape-dependent normalization factor k for a single volumetric shape is given by:

$$k \approx \frac{3V^{2/3}}{A}$$

$V$ = volume, $A$ = surface area

This approximation can be tested by substituting in the formulas for the volume and surface area of a sphere $$\left( V = \frac{4}{3}\pi r^3, A = 4\pi r^2 \right).$$

The radius variables and constants cancel such that the constant $$\sqrt[3]{\frac{3}{4\pi}}$$

remains. This is the same k value that was determined above.

Through a process similar to deriving the general two-dimensional formula, it can be shown that the three-dimensional general formula for the average distance between any two overlapping shapes is given by:

$$\bar{d} = \frac{k_1 + k_2}{2}(\sqrt[3]{V_U} - \sqrt[3]{V_I}) = \frac{3}{2}\left(\frac{V_1^{2/3}}{A_1} + \frac{V_2^{2/3}}{A_2}\right)(\sqrt[3]{V_U} - \sqrt[3]{V_I})$$

The analogous three-dimensional formula for the average distance when only a single shape is present and being compared to a non-existing second volumetric shape is given by:

$$\bar{d} = \frac{3V}{A}$$

The analogous three-dimensional formula for measuring the difference between two non-overlapping volumetric shapes is given by:

$$\bar{d} = \frac{\bar{d}_1 + \bar{d}_2}{2} = \frac{3}{2}\left(\frac{V_1}{A_1} + \frac{V_2}{A_2}\right)$$

IX. Computer System

Any of the computer systems mentioned herein may utilize any suitable number of subsystems. Examples of such subsystems are shown in FIG. 9 in computer system 10. In some embodiments, a computer system includes a single computer apparatus, where the subsystems can be the components of the computer apparatus. In other embodiments, a computer system can include multiple computer apparatuses, each being a subsystem, with internal components.

The subsystems shown in FIG. 9 are interconnected via a system bus 75. Additional subsystems such as a printer 74, keyboard 78, storage device(s) 79, monitor 76, which is coupled to display adapter 82, and others are shown. Peripherals and input/output (I/O) devices, which couple to I/O controller 71, can be connected to the computer system by any number of means known in the art such as input/output (I/O) port 77 (e.g., USB, FireWire®). For example, I/O port 77 or external interface 81 (e.g. Ethernet, Wi-Fi, etc.) can be used to connect computer system 10 to a wide area network such as the Internet, a mouse input device, or a scanner. The interconnection via system bus 75 allows the central processor 73 to communicate with each subsystem and to control the execution of instructions from system memory 72 or the storage device(s) 79 (e.g., a fixed disk, such as a hard drive or optical disk), as well as the exchange of information between subsystems. The system memory 72 and/or the storage device(s) 79 may embody a computer readable medium. Any of the data mentioned herein can be output from one component to another component and can be output to the user.

A computer system can include a plurality of the same components or subsystems, e.g., connected together by external interface 81 or by an internal interface. In some embodiments, computer systems, subsystem, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C# or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications, and descriptions mentioned here are incorporated by reference in their entirety for all purposes. None is admitted to be prior art.

What is claimed is:

1. A method of determining an accuracy of shape-determining processes for identifying shapes of a body tissue in one or more images of a patient, the method comprising:
   receiving first data that defines a first boundary of a first shape of the body tissue in at least a portion of the one or more images, the first shape being determined by a first shape-determining process;
   receiving second data that defines a second boundary of a second shape of the body tissue in at least a portion of the one or more images, the second shape being determined by a second shape-determining process;
   determining, by a computer system, an intersection shape of the first shape and the second shape;
   determining, by the computer system, a union shape of the first shape and the second shape;
   calculating, by the computer system, a difference between the union shape and the intersection shape;
   computing, by the computer system, a shape similarity metric based on the difference; and
   providing the shape similarity metric for determining an accuracy of the second shape-determining process relative to the first shape-determining process.

2. The method of claim 1, wherein the first data and the second data includes the one or more images of the patient, and wherein the method further comprises:
   determining a reference point in the one or more images, wherein each of the one or more images include the reference point; and
   defining coordinates of the first shape and the second shape with respect to the reference point.

3. The method of claim 2, wherein calculating the difference between the union shape and the intersection shape includes:
   for each of a plurality of points on the intersection shape:
      identifying a corresponding point on the union shape that corresponds to the point on the intersection shape; and
      calculating a distance between the point on the intersection shape and the corresponding point on the union shape; and
   computing an average of the distances to obtain the difference.

4. The method of claim 1, wherein calculating the difference between the union shape and the intersection shape includes:
   computing an intersection size of the intersection shape;
   computing a union size of the union shape; and
   subtracting the intersection size from the union size to obtain the difference.

5. The method of claim 4, wherein computing the shape similarity metric includes:
   calculating a normalization factor; and
   multiplying the difference and the normalization factor to obtain the shape similarity metric.

6. The method of claim 5, wherein the normalization factor is determined based on a property of the first shape and the second shape.

7. The method of claim 5, wherein computing the intersection size includes taking a square root of an intersection area of the intersection shape, wherein computing the union size includes taking the square root of a union area of the union shape, and wherein the normalization factor includes a sum of:
   a first term including the square root of a first area of the first shape divided by a first circumference of the first shape; and a second term including the square root of a second area of the second shape divided by a second circumference of the second shape.

8. The method of claim 5, wherein the first shape is a first two-dimensional slice of the body tissue, wherein the second shape is a second two-dimensional slice of the body tissue, the method further comprising:
computing shape similarity metrics for other slices of the body tissue; and
combining the shape similarity metrics for the slices to obtain a total shape similarity metric.

9. The method of claim 5, wherein the first shape and the second shape are three-dimensional, wherein computing the intersection size includes taking a cube root of an intersection volume of the intersection shape, wherein computing the union size includes taking the cube root of a union volume of the union shape, and wherein the normalization factor is $$\frac{3}{2}\left(\frac{V_1^{2/3}}{A_1} + \frac{V_2^{2/3}}{A_2}\right),$$

where $V_1$ is a first volume of the first shape, $V_2$ is a second volume of the second shape, $A_1$ is a first surface area of the first shape, and $A_2$ is a second surface area of the second shape.

10. A method of determining an accuracy of shape-determining processes for identifying shapes of a body tissue in one or more images of a patient, the method comprising:
receiving first data that defines a first boundary of a first shape of the body tissue in at least a portion of the one or more images, the first shape being determined by a first shape-determining process;
determining, by a computer system, that the first shape does not intersect with a second shape; and
computing, by the computer system, a shape similarity metric by:
determining a first size of the first shape, the first size determined using a first area or a first volume of the first shape and a first normalization factor for the first shape; and
using the first size to compute the shape similarity metric.

11. The method of claim 10, further comprising:
receiving second data that defines a second boundary of the second shape of the body tissue, the second shape being determined by a second shape-determining process;
wherein computing the shape similarity metric further includes:
determining a second size of the second shape, the second size determined using a second area or a second volume of the second shape and a second normalization factor for the second shape; and
calculating a sum including the first size and the second size.

12. The method of claim 11, wherein:
the first shape and the second shape are two-dimensional and the first normalization factor of the first shape includes an inverse of a circumference of the first shape, or
the first shape and the second shape are three-dimensional and the first normalization factor of the first shape includes the inverse of a surface area of the first shape.

13. The method of claim 10, wherein a corresponding second shape does not exist, and wherein:
the first shape is two-dimensional and the shape similarity metric is $$\frac{2a}{C}$$

where $\alpha$ is an area of the first shape and C is a circumference of the first shape, or
the first shape is three-dimensional and the shape similarity metric is $$\frac{3V}{A}$$

where V is a volume of the first shape and A is a surface area of the first shape.

14. The method of claim 10, further comprising:
comparing the shape similarity metric for the first shape and the second shape to another shape similarity metric of a different pair of shapes.

15. A method of comparing shapes of body tissues in images of patients, the method comprising:
receiving first data that defines a first boundary of a first shape of a first body tissue of a first patient;
for each of a plurality of second patients:
receiving second data that defines a second boundary of a second shape of a second body tissue of one of the plurality of second patients;
determining, by a computer system, an intersection shape of the first shape and the second shape;
determining, by the computer system, a union shape of the first shape and the second shape;
calculating, by the computer system, a difference between the union shape and the intersection shape; and
computing, by the computer system, a shape similarity metric based on the difference; and
identifying a first shape similarity metric that satisfies one or more criteria, the first shape similarity metric corresponding to a particular second patient.

16. The method of claim 15, wherein the first body tissue is a tumor, wherein treatment information for the particular second patient is retrieved, and wherein the treatment information includes one or more of: a geometry of a radiation beam, a dosage of the radiation beam, and a number of sessions for treatment using the radiation beam.

17. The method of claim 15, further comprising:
aligning the first shape and the second shape in a coordinate space.

18. The method of claim 15, wherein the one or more criteria specifies a highest shape similarity metric is to be selected.

19. The method of claim 15, wherein identifying the first shape similarity metric that satisfies the one or more criteria includes:
identifying a set of the shape similarity metrics of the plurality of second patients that satisfy the one or more criteria; and
selecting the first shape similarity metric from the set of the shape similarity metrics.

20. The method of claim 19, wherein the one or more criteria include a threshold value for the shape similarity metrics.

21. The method of claim 19, wherein selecting the first shape similarity metric from the set of the shape similarity metrics includes:
   identifying the particular second patient corresponding to the first shape similarity metric based on treatment outcomes for the second patients whose shape similarity metrics satisfy the one or more criteria.

22. The method of claim 16, further comprising:
   determining a treatment plan for the first patient based on the treatment information.

23. The method of claim 22, further comprising:
   performing the treatment plan using a radiation beam.

24. The method of claim 15, wherein the first shape and the second shapes are determined using a same shape-determining process.

25. A computer product comprising a non-transitory computer readable medium storing a plurality of instructions that when executed control a computer system to determine an accuracy of shape-determining processes for identifying shapes of a body tissue in one or more images of a patient, the instructions comprising:
   receiving first data that defines a first boundary of a first shape of the body tissue, the first shape being determined by a first shape-determining process;
   receiving second data that defines a second boundary of a second shape of the body tissue, the second shape being determined by a second shape-determining process;
   determining an intersection shape of the first shape and the second shape;
   determining a union shape of the first shape and the second shape;
   calculating a difference between the union shape and the intersection shape;
   computing a shape similarity metric based on the difference; and
   providing the shape similarity metric for determining an accuracy of the second shape-determining process relative to the first shape-determining process.

* * * * *